United States Patent [19]
Drewery

[11] Patent Number: 6,106,704
[45] Date of Patent: Aug. 22, 2000

[54] WASTEWATER TREATMENT SYSTEM WITH AIR PUMP/CONTROL PANEL PLATFORM

[75] Inventor: T. Gig Drewery, Kountze, Tex.

[73] Assignee: Aqua Partners, Ltd., Lumberton, Tex.

[21] Appl. No.: 09/151,327

[22] Filed: Sep. 11, 1998

[51] Int. Cl.[7] .................................................. B01D 35/14
[52] U.S. Cl. ............................... 210/86; 210/85; 210/90; 210/123; 210/207; 210/220; 210/232
[58] Field of Search ................................. 261/122.1, 123; 210/85, 86, 90, 97, 123, 143, 150, 151, 195.1, 207, 220, 232, 221.2

[56] References Cited

U.S. PATENT DOCUMENTS

| | | | |
|---|---|---|---|
| 2,616,848 | 11/1952 | Griffith | 210/294 |
| 2,989,186 | 6/1961 | Weis | 210/150 |
| 3,149,071 | 9/1964 | Burgoon et al. | 210/197 |
| 3,438,499 | 4/1969 | Reckers | 210/199 |
| 3,618,779 | 11/1971 | Goodman | 210/195.4 |
| 3,627,135 | 12/1971 | Goodman | 210/195.4 |
| 3,741,393 | 6/1973 | Estes et al. | 210/195.4 |
| 3,767,051 | 10/1973 | Thompson | 210/197 |
| 3,819,054 | 6/1974 | Long et al. | 210/195.3 |
| 4,059,524 | 11/1977 | Chataigner et al. | 210/220 |
| 4,246,114 | 1/1981 | Krebs et al. | 210/151 |
| 4,505,813 | 3/1985 | Graves | 210/86 |
| 4,650,577 | 3/1987 | Hansel . | |
| 4,818,384 | 4/1989 | Mayer | 210/86 |
| 4,983,285 | 1/1991 | Nolen . | |
| 5,162,083 | 11/1992 | Forbes et al. | 210/199 |
| 5,221,470 | 6/1993 | McKinney . | |
| 5,254,246 | 10/1993 | Rivelli et al. | 210/195.4 |
| 5,266,239 | 11/1993 | Drewery . | |
| 5,859,589 | 1/1999 | McGrew | 340/614 |
| 5,874,002 | 2/1999 | Cormier | 210/626 |

OTHER PUBLICATIONS

Clearstream Wastewater Systems Brochure, Oct. 1993, pp. 1–4.

Hydro–Action, Inc. Brochure, 1994, pp. 1–4.

*Primary Examiner*—W. L. Walker
*Assistant Examiner*—Terry K. Cecil
*Attorney, Agent, or Firm*—Harrison & Egbert

[57] ABSTRACT

A wastewater treatment system having a tank with an aeration compartment and a clarifier compartment, an air pump affixed to a top of the tank and having an air line delivering air to the aerator of the aeration compartment. The air line extends through an interior of the tank. A control panel is also affixed to a top of the tank. The control panel is electrically connected to the air pump. A raised platform is formed on the top of the tank such that an outer periphery of the platform intersects at least at one point of the cylindrical wall. The top of the tank also has an access opening formed therein located along the periphery of the cylindrical wall diametrically opposite the platform. The air pump is affixed to the horizontal platform. A housing is attached to the platform. The housing extends over the air pump and the control panel. The housing includes a base affixed to the platform and a cover removably affixed to the base so as to extend over and around the air pump and the control panel. The control panel has an electrical supply line connected thereto which extends outwardly of the tank. A float switch, a pressure transducer and a warning light are electrically connected to the control panel.

15 Claims, 8 Drawing Sheets

WASTEWATER TREATMENT SYSTEM WITH AIR PUMP/CONTROL PANEL PLATFORM

TECHNICAL FIELD

The present invention relates to wastewater treatment systems. More particularly, the present invention relates to wastewater treatment systems which utilize air pumps and which are electrically connected to control panels. Furthermore, the present invention relates to extended aeration wastewater treatment systems which include pump tanks connected thereto.

BACKGROUND ART

Recently, home wastewater treatment systems have become increasingly popular. Prior to the development of home wastewater treatment systems, septic tanks were the conventional manner of cleaning home and small commercial establishment wastes from the water. In view of the great cost associated with connecting a home sewage system with the city sewage system, it is economically beneficial to employ the use of home wastewater treatment systems. Present home wastewater treatment systems are a downsized, underground version of the treatment processes employed by large central treatment plants.

Essentially, the treatment process correlates with an example found in nature. When a creek runs through rocks and over logs, turbulence is created and oxygen is captured. Aerobic bacteria utilize oxygen in their digestion processes. This allows the creek to purify itself. The home wastewater treatment systems simply employ a speeded-up version of this process in a manner known as "extended aeration". Air or oxygen is brought in by means of an efficient air pump and then diffused into thousands of tiny air bubbles by means of fine air diffusion. As these tiny bubbles move upward through the wastewater, oxygen is captured and the same purification process takes place. Such a system can allow normal household waste water to be reduced to a clear odorless liquid.

One such system has been manufactured and sold by Hydro-Action, Inc. of P.O. Box 12583, Beaumont, Texas. The system is known as the HYDRO-ACTION (TM) system. It is a self-contained automatic system. The HYDRO-ACTION (TM) system incorporates two separate compartments, each performing a specific function in the digestion process. First, raw waste water enters the aeration compartment and is mixed with activated sludge and aerated. An air pump injects large quantities of air into this compartment by means of porous ceramic diffusers located above the bottom perimeter of the aeration compartment. These diffusers create thousands of tiny air bubbles which provide oxygen for the aerobic digestion process and mixes the compartment's entire contents. These tiny bubbles provide better air-to-liquid contact so as to hasten the aerobic digestion process. Aerobic bacteria then use the oxygen in solution to break down the wastewater so as to convert the wastewater into an odorless liquid and gas. Hydraulic displacement causes the mixture to enter the second and final compartment. Due to the calm conditions and sloping walls of the clarification compartment, any remaining settleable material is encouraged to return to the aeration compartment for further treatment. The remaining effluent, upon reaching the outlet piping, is clear and odorless.

This HYDRO-ACTION (TM) system allows homes to be built on clay soil, rock or high water tables. This system also helps to protect the ground water supplies and eliminates gross pollution of ditches and streams. The effluent discharged from such a system is allowed by some state and local regulatory agencies to be discharged directly to a stream or pond or used to surface irrigate lawns and pastures. In areas where surface discharge is not allowed, subsurface disposal methods can be used with good success.

Conventionally, in such extended aeration treatment systems, a control panel is connected to the wastewater treatment system so as to control and monitor the conditions within the treatment tank. An air pump is also used so as to supply air to the aerators and diffusers within the aeration compartment of the tank. The control panel is typically electrically connected to the air pump so as to monitor the pressure delivered by the air pump. In conventional practice, a wastewater treatment tank will be buried in the earth a suitable distance away from a home or a commercial establishment. Since these wastewater treatment tanks are relatively large (at least 500 gallons capacity), a significant hole must be formed in the earth so as to accommodate the wastewater treatment system. After the wastewater treatment system is installed into the earth, only the cover of the access opening of the tank will be exposed above the earth. In normal practice, the control panel will be placed onto a wall of the home or commercial establishment. The air pump will be placed in a location generally adjacent to the wall of the commercial establishment. So as to allow the electrical lines from the control panel to reach the tank, it is necessary to trench the earth so as to allow conduits to extend from the home or commercial establishment to the tank. Similarly, trenching must be carried out in the earth so as to allow the air lines from the air pump to pass to the treatment tank. Additional trenching may be required so as to allow the electrical lines from the control panel to be connected to the air pump.

This process of trenching the earth is a very time consuming and tedious process. Many homeowners are reluctant to allow such trenching to occur. Typically, the installers of such extended aeration wastewater treatment systems will take shortcuts in the installation of the electrical conduits and air lines. Under certain circumstances, these lines will cross in the earth. In other circumstances, separate trenches will not be formed for the electrical lines and for the air lines. Instead, the installer of the extended aeration wastewater treatment system will simply attempt to place the air lines and the electrical lines together in a single trench. This practice is improper since the crossing of the air lines and the electrical lines can pinch the air lines so as to reduce air flow to the aeration system. Furthermore, when the electrical lines and the air lines are installed in this manner, any settling of the earth will cause the air line to become pinched.

Normally, the air pump must be placed on a graded surface. As such, the installer must grade a section of the earth so as to allow for the placement of the air pump on a level surface. Under certain circumstances, the air pump will be placed upon a concrete base so as to be properly supported in a desired position above the earth. The installation of the air pump and the construction of the base for the air pump takes a great deal of time during the installation of such aerobic wastewater treatment systems.

When the control panel is installed onto the wall of the house, it is necessary for the installer to drill holes in the wall of the house and to position the control panel in a desired location. Under certain circumstances, the homeowner may not wish to have a control panel placed on the wall of the house. Under other circumstances, the placement of the control panel on the wall of the house is in a difficult to reach or otherwise undesirable location. In any event, a great deal of labor is required to properly place the control panel on the house.

In the installation of the control panel and the air pump, the installer is required to have a suitable level of knowledge of electrical circuitry. This knowledge is required so as to allow the installer to properly connect the electrical line to the air pump components and to the treatment tank components. Wires must be extended over a great deal of distance within conduits so as to allow the proper electrical connections to be made. If an improper electrical connection is made, then the aerobic wastewater treatment system will not function in the desired manner. In other circumstances, short circuits can occur if the electrical lines are not installed properly. It has been found that the typical installer of such aerobic wastewater treatment systems lacks sufficient knowledge in electrical circuitry to effectively install the wastewater treatment system. Under certain circumstances, electricians must be called in so as to complete the connections.

Whenever it is necessary to service such extended aeration wastewater treatment systems, the person carrying out the service must move back and forth between the control panel, the air pump and the tank so as to properly test the system. This can be a tedious task which requires several trips back and forth between the various components of the system. Under other circumstances, two persons will be required to effectively test and service the treatment tank. For example, it is often necessary to have one person stationed by the air pump while the other person is inspecting the interior of the treatment tank. In other circumstances, one person must be stationed by the control panel while the other person is stationed by the treatment tank. The arrangement of the air pump, the control panel and the treatment tank in conventional systems greatly complicates the ability to properly service the treatment tank.

In certain circumstances, a pump tank is connected to the treatment tank of the extended aeration system. The pump tank is used so as to receive water from the treatment tank and to allow the liquid from the treatment tank to be pumped for irrigation purposes. The pump tank has a liquid pump located within the interior of the tank. Whenever a pump tank is used, it is necessary to further trench the earth so as to allow for the installation of the electrical power supply line to reach the pump tank. Normally, this requires a conduit to be installed in the earth for the distance from the control panel to the pump tank. Typically, several electrical lines must extend from the control panel to the pump tank. The installation of the pump tank greatly complicates the ability to install the wastewater treatment system. Additionally, further electrical knowledge is required so as to effectively connect the various leads of the electrical lines to the pump tank with the connectors from the control panel.

In the past, it has been difficult or impossible to consider the placement of an air pump and a control panel on the top of the treatment tank. Typically, the treatment tank will have a curved top surface which extends over the cylindrical tank. A very large access opening is placed centrally of the top of the tank. This access opening allows access to the interior of the tank. Conventionally, the access opening will open so as to allow a person to inspect the interior of the clarifier compartment. However, the access opening generally makes it difficult to inspect the interior of the aeration compartment. There is very little space on the top of the tank beyond the area of the access opening. As such, there is insufficient space on the top of the tank to accommodate an arrangement of the air pump and the control panel.

A preferred technique for the placement of the aerator assemblies within such extended aeration systems has been to place a first aerator on one side of the clarifier compartment and a second aerator on the opposite side of the clarifier compartment. Under circumstances where the access opening is placed centrally of the top of the tank, it becomes a very difficult problem to access such aerator assemblies for inspection and repair. Since the aerator assemblies are placed in inconvenient locations within the tank, the maintenance or repair personnel must reach deeply into the tank so as to "thread" the aerator conduit through openings formed in the clarifier compartment. This is a very difficult, time consuming and tedious process. In the past, it has been desirable to make the access opening as large as possible so as to facilitate the ability to inspect and repair the aerator assemblies. However, in contrast, the homeowner prefers not to have large "monuments" extending outwardly of the earth near his or her home. As such, a need has developed so as to minimize the size of such "monuments" associated with the extended aeration wastewater treatment system.

It is an object of the present invention to provide a wastewater treatment system which allows the air pump and control panel to be affixed to a surface of the top of the tank.

It is another object of the present invention to provide a wastewater treatment system which eliminates most of the trenching from the control panel and the air pump to the treatment tank.

It is a further object of the present invention to provide a wastewater treatment system which minimizes any possibility of crossing of the air lines and the electrical lines between the control panel and the air pump and the treatment tank.

It is a further object of the present invention to provide a wastewater treatment system which eliminates the need to grade the base of the air pump in the earth.

It is a further object of the present invention to provide a wastewater treatment system which minimizes the possibility of the air pump leaning during operation.

It is a further object of the present invention to provide a wastewater treatment system which eliminates the need to attach the control panel to a wall of the house.

It is a further object of the present invention to provide a wastewater treatment system which minimizes the requirements for the installation of the wastewater treatment system.

It is still another object of the present invention to provide a wastewater treatment system which reduces the skill level required of the installer of the wastewater treatment system.

It is still a further object of the present invention to provide a wastewater treatment system which improves the serviceability of the system.

It is still another object of the present invention to provide a wastewater treatment system which minimizes the amount of time required to install the system.

It is still a further object of the present invention to provide a wastewater treatment system which is easy to assemble, relatively easy to manufacture, and relatively inexpensive.

It is still a further object of the present invention to provide a wastewater treatment system which minimizes the size and number of "monuments" extending outwardly of the earth.

It is still a further object of the present invention to provide a wastewater treatment system which enhances the ability to aerate the effluent in the aeration compartment.

These and other objects and advantages of the present invention will become apparent from a reading of the attached specification and appended claims.

SUMMARY OF THE INVENTION

The present invention is a wastewater treatment system that comprises a tank having an aeration compartment and a clarifier compartment, an air pump affixed to a top of the tank and having an air line delivering air to an aerator of the aeration compartment, and a control panel affixed to a top of the tank so as to be electrically connected to the air pump.

The tank has a generally horizontal platform formed on the top of the tank. The air pump and the control panel are affixed to the horizontal platform. A housing is attached to the platform. This housing extends over the air pump. The air pump has an electrical line supplying electricity thereto. The electrical line is connected to the control panel. The electrical supply line to the control panel extends through an opening in the housing such that the electrical supply line can pass exterior of the tank. The housing comprises a base affixed to the platform and a cover removably affixed to the base. The platform has a hole formed therein. The air line from the air pump passes through the hole and into the interior of the tank. The air pump is positioned on a surface of the base above the platform. The cover extends over and around the air pump and the control panel.

A float switch is electrically connected to the control panel for monitoring a level of liquid within the tank. A pressure transducer is connected to the air pump and to the control panel. The pressure transducer serves to monitor a pressure of air passing through the air line to the aerator. A warning light is affixed to an exterior of the housing. This warning light is connected to the control panel within the housing. The warning light signals of an alarm condition affecting an interior of the tank. A test/normal/silence switch is affixed to an exterior of the housing. The test/normal/silence switch is electrically connected to the control panel so as to test the warning light.

In the present invention, the tank has a cylindrical wall extending therearound. A raised platform is formed on the top of the tank such that an outer periphery of the platform intersects at least at one point of the cylindrical wall. The top of the tank also has an access opening formed therein located along the periphery of the cylindrical wall diametrically opposite the platform. The aerator is positioned in the aeration compartment directly below the access opening. The access opening has a portion of the aeration compartment and a portion of the clarifier compartment directly therebelow.

The platform on the top of the tank has another access opening formed therein. Another aerator is placed directly below the access opening on the platform. The aerators are positioned 180° apart on opposite sides of the clarifier compartment. The bottom of the tank comprises a continuous flat surface extending between the aerators and below the clarifier compartment.

In the present invention, a pump tank is connected to an outlet of the treatment tank. The pump tank has a liquid pump therein for passing a liquid outwardly from an interior of the pump tank. The control panel is electrically interconnected to the liquid pump of the pump tank. An electrical line extends from the control panel to the liquid pump. This electrical line extends over the top of the treatment tank. The pump tank has a level switch therein. The level switch serves to determine a level of liquid in the pump tank. The level switch is interconnected to the liquid pump so as to actuate the liquid pump when liquid reaches a desired level within the pump tank. The level switch is electrically interconnected to the control panel. A chlorinator is connected to an outlet of the treatment tank. The chlorinator is positioned within an interior of the pump tank.

DETAILED DESCRIPTION OF THE PRESENT INVENTION

Figure 1:
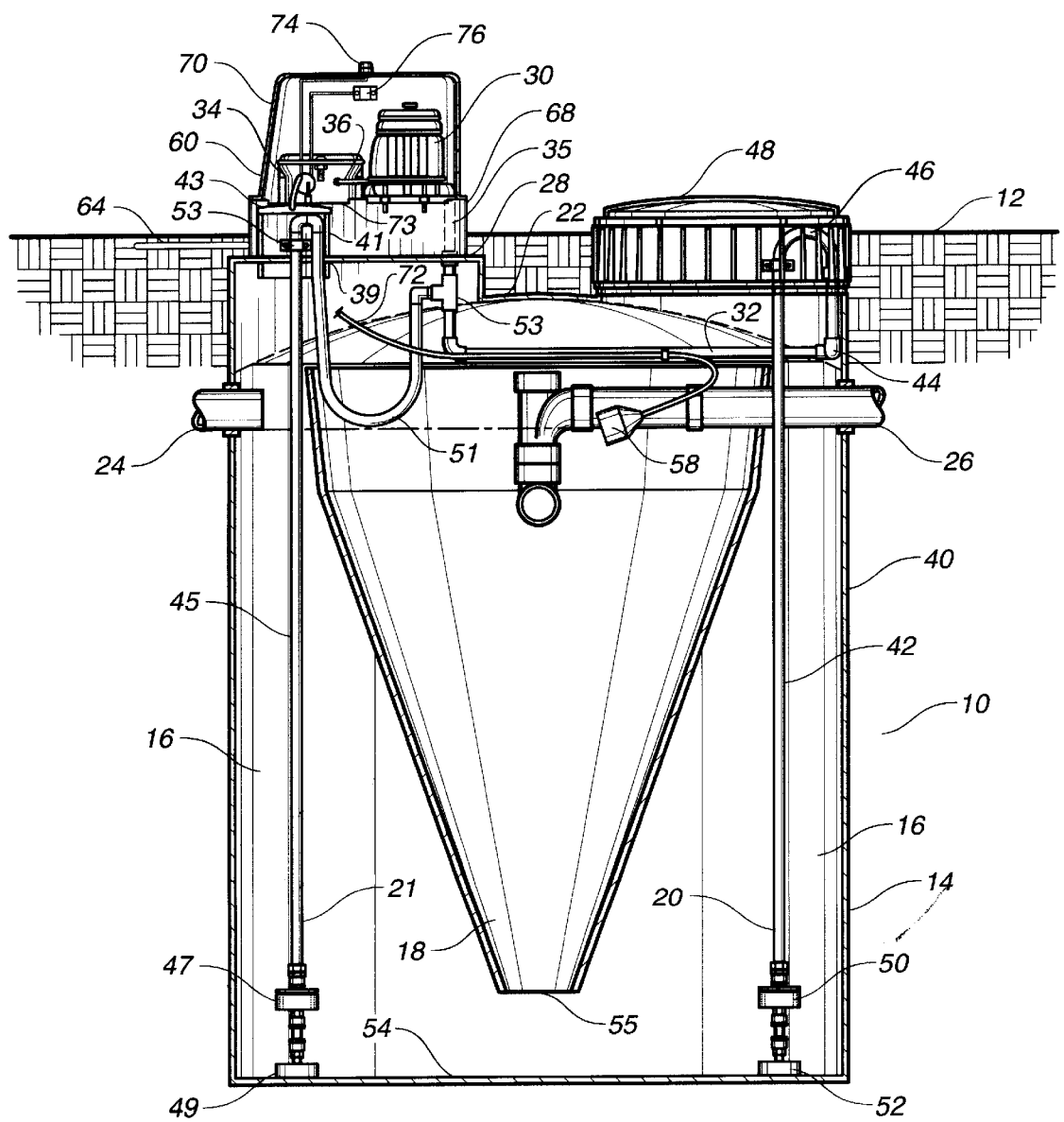
FIG. 1 is a cross-sectional view showing the preferred embodiment of the present invention.

Referring to FIG. 1, there is shown at 10 the wastewater treatment system in accordance with the preferred embodiment of the present invention. The wastewater treatment system 10 is illustrated as being buried within the earth 12. The wastewater treatment system 10 includes a treatment tank 14 having an aeration compartment 16 and a clarifier compartment 18. A first aerator 20 extends into the aeration compartment 16 of the treatment tank 14 on one side of the clarifier compartment 18. A second aerator 21 extends into the aeration compartment 16 on an opposite side of the clarifier compartment 18. A top 22 extends over and caps an open end of the tank 14 and over the aeration compartment 16 and the clarifier compartment 18. The tank 14 has an inlet 24 and an outlet 26. A raised platform 28 is formed on the top 22 of the tank 14. The outer periphery of the platform intersects at least at one point of a cylindrical wall of the tank. An air pump 30 is affixed to the platform 28 of tank 14. The air pump 30 has an air line 32 extending from the air pump 30 to the aerator 20. The air pump 30 has another air line extending to the second aerator 21. The air line 32 extends interior of the tank 14. A control panel 34 is also affixed to the platform 28 on the top 22 of the tank 14. The control panel 34 is electrically connected by line 36 to the air pump 30.

The tank 14 has a generally standard configuration except for the offset arrangement of the access opening 38. In the present invention, the top 22 is configured so as to have an offset access opening 38. The access opening 38 is positioned between the center of the top 22 and a wall 40 of the tank 14. Access opening 38 will have a diameter less than a radius of the tank 14. The aerator 20 includes a flexible conduit 42 which extends from the connection 44 with the air line 32. The flexible conduit 42 extends upwardly so as to have an upper portion 46 adjacent to the cover 48 of the access opening 30. The air line 42 extends downwardly so as to pass air to a diffuser assembly 50 located at the bottom of the tank 14. An anchor 52 serves to allow the diffuser assembly 50 to remain in position adjacent to the bottom 54 of tank 14. The diffuser assembly 50 is a ceramic diffuser of the type described in U.S. Pat. No. 5,266,239 to the present invention.

In normal practice, this positioning of the first aerator 20 facilitates the ability to install and repair the wastewater treatment system 10. Since the diffuser assembly 50 is positioned directly below the access opening 38, the diffuser assembly 50 can be easily removed for inspection and repair by simply pulling on the flexible conduit 42. This will cause the anchor 52 to lift from the bottom 54 of the tank 14 so that the diffuser assembly 50 can be lifted therefrom. The positioning of the access opening 38 in this offset arrangement also allows a service man to take samples of the liquid within the aeration compartment 16 or from the clarifier compartment 18. Since the access opening 38 is positioned directly above a portion of the aeration compartment and the clarifier compartment 18 such sampling can be easily carried out without difficult manipulation.

It was found that the formation of the offset access opening 38 allowed a significant amount of space to remain on the opposite wall 56 of the cylindrical tank 14. Since a great deal of space remained on the top 22, it was possible to form a platform 28 adjacent to the wall 56 of the tank 14. The platform 28 has a generally horizontal surface. A hole is formed in the platform 28 so as to allow the air line 35 to pass therethrough. Additionally, an electrical line 72 to the float switch 58 can also extend through a hole in the platform 28. A housing arrangement 60 is attached to the platform 28. The housing 60 will extend over the air pump 30 and the control panel 34. An opening is formed in the housing 60 so as to allow the electrical supply line 64 to be connected to the control panel 34. The electrical supply line 64 is positioned within a conduit extending through the earth 12. In the present invention, it will be only necessary to trench so as to allow the electrical conduit (along with the electrical line 64) to extend from a source of electrical power to the treatment tank 14.

In the present invention, the housing 60 includes a base 68 affixed to the platform 28. The base 68 can be attached to the platform 28 by bolting, by adhesives, or by any other desired method. The air pump 30 and the control panel 34 are positioned on a surface of the base 68 above the platform 28. The platform 28 is positioned below the surface of the earth 12. The base 68 can be attached so as to have a surface extending above the earth 12. A cover 70 is affixed to the base 68. This cover 70 will extend around and over the air pump 30 and the control panel 34.

So as to facilitate access to the second aerator 21, a small diameter access opening 39 is formed in the surface of the platform 28. A small diameter (approximately six inches) pipe 41 will extend through the opening 39 so as to have an end opening in the interior of the tank 14. A small cover 43 is positioned over the opposite end of the pipe 41. When the cover 70 is removed from the top of the base 68, the cover 43 associated with access opening 39 can be exposed by lifting the control panel 34 upwardly. The cover 43 can be removed so as to gain access to the air conduit 45 extending to the diffuser assembly 47. The diffuser assembly 47 has a similar configuration as the diffuser assembly 50 associated with the first aerator 20. An anchor 49 serves to maintain the diffuser assembly 47 adjacent to the bottom 54 of the tank 14.

The air line 45 has inverted U-shaped connectors located at its upper end adjacent to the cover 43 of access opening 39. A flexible line 51 extends downwardly from this inverted U-shaped connector so as to be connected to a T-shaped fitting 53 associated with the air line 35 extending from air pump 30. As such, the air pump 30 will serve to deliver air through the air conduit 45 to the diffuser assembly 47. The present invention facilitates access to the diffuser assembly 47 by providing the flexible air line 51 of an extended length. This "slack" in the air line 51 allows a serviceman to simply remove the cover 43 from the access opening 39, to grasp the inverted U-shaped connector and to lift the flexible air line 45 upwardly. The slack in the air line 51 should be sufficient so that the serviceman can draw the air line 45 a suitable distance outwardly from the top of the pipe 41 formed in the access opening 39. A clip 53 is provided in the pipe 41 of the access opening 39 so as to secure the air line 45 in its desired position within the tank 16.

As can be seen in FIG. 1, the first aerator 20 is located on the opposite side of the clarifier compartment 18 from the second aerator 21. Preferably, the aerators 20 and 21 are positioned approximately 180° from each other. The bottom 54 of the tank 14 is a continuous flat bottom extending below the bottom opening 55 of the clarifier compartment 18 and between the diffuser assemblies 47 and 50. Experiments have shown that this arrangement creates a sweeping "to-and-fro" motion below the opening 55 of the clarifier compartment 18. Furthermore, the distant positioning of the diffuser assemblies 47 and 50 creates individual flow paths of air directly to the surface of the effluent within the aeration compartment 16. Eventually, a "vortex" effect will cause the air bubbles to be pulled downwardly. As such, the arrangement of the diffuser assemblies 47 and 50 within the configuration of the present invention creates very small bubbles and keeps the bubbles in solution for a longer period of time. In the preferred embodiment of the present invention two, and only two, aerators 20 and 21 provide the aeration capability of the wastewater treatment system 10.

It should be noted that by placing the small diameter access opening 39 directly in the platform 28 and below the cover 70, the access opening remains hidden from the surface of the earth 12. As a result of this configuration, the access opening 38, located on the opposite side of tank 14 can be of a minimal size. The result is that the arrangement of the present invention minimizes the size of the "monuments" located in the earth. The present invention hides one of its access openings and minimizes the size of the other access opening. Thus, unlike the prior art, only minimal sized monuments will extend outwardly of the earth 12.

In the present invention, the control panel 34 has one electrical line 72 connected thereto and extending through the interior of the tank 14 so as to be connected to the float switch 58. The float switch 58 serves to monitor a level of liquid within the clarifier compartment 18 of the tank 14. A pressure transducer 73 is also connected to the control panel 38. Pressure transducer 73 is a small ⅛" tube which is connected to the air line 32 (or to the pump 30) so as to monitor the pressure in the air line 32. The pressure transducer 73 serves to signal an alarm condition whenever the pressure within the air line 32 should become too low. A warning light 74 is connected to the cover 70 of the housing 60. The warning light 74 serves to provide an exterior indication of an alarm condition affecting the interior of the tank 14. For example, if the pump 30 is not functioning properly or if the level of liquid within the interior of the tank 14 becomes too high, then the warning light 64 can be illuminated. Additionally, a horn can be provided on the control panel 38 so as to provide an audible indication of such an alarm condition. A test/normal/silence switch 76 is also connected to the exterior of the cover 70 of the housing 60 so as to allow the user to test the warning light 74 and to test other components of the wastewater treatment system. As such, by the placement of the warning light 74 and the switch 76 on the exterior of the cover 70, it is not necessary to expose the pump 30 or the control panel 34 to the exterior elements in order to effectively test the system.

Figure 2:
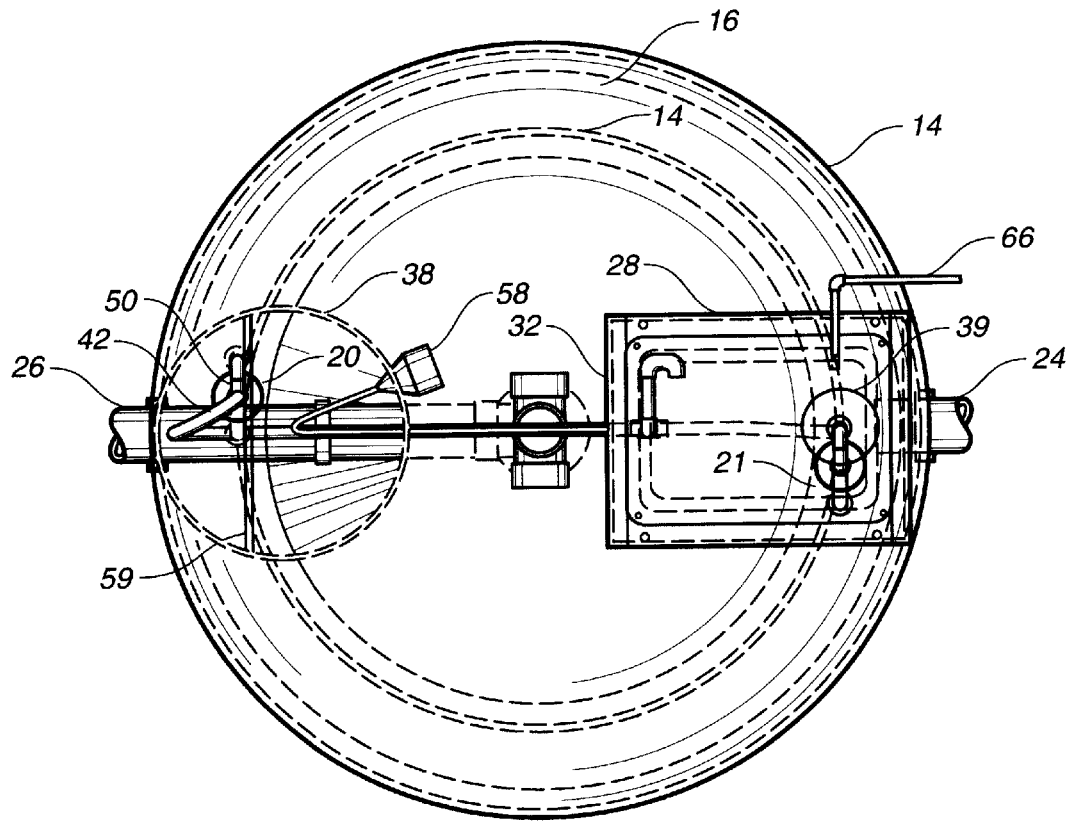
FIG. 2 is a plan, partially transparent, view of the present invention showing the platform as formed on the top of the treatment tank.

FIG. 2 shows the tank 14 prior to the installation of the housing 60. As can be seen, a generally rectangular shaped platform 28 is formed on the top 22 of the tank 14. The outer periphery of the platform 28 intersects at least at one point of a cylindrical wall of the tank 14. The top of the tank also has an access opening 38 formed therein located along the periphery of the cylindrical wall diametrically opposite the platform 28. Inlet 24 will extend through the wall of the tank 14 into the interior of the aeration compartment 16 of tank 14. Outlet line 26 will extend from the clarifier compartment 18 to a location exterior of the tank 14.

In FIG. 2, it can be seen that the diffuser assembly 50 and its associated air line 42 are offset from the location of the outlet line 26. This offset arrangement is carried out since the air line 42 will be unable to pass through the outlet line 26. So that the aerators 20 and 21 can be positioned 180° apart, the second aerator 21 will be offset on the opposite side of the inlet 24. Additionally, the second aerator 21 will not block any flow of effluent into the aeration compartment 16. A bar 59 extends across the access opening 38. This bar 59 allows the flexible air line 42 to be secured thereto in a desired position offset from the outlet line 26. A suitable clip can be attached to the bar 59 so as to assure that the diffuser assembly 50 is positioned in its desired location. It can be further seen that the access opening 39 is located generally centrally of the rectangular configuration of the platform 28. The access opening 39 is located in a position so that samples of the effluent through the inlet 24 can be taken easily. Furthermore, the access opening 39 has a sufficient diameter so that the diffuser assemblies associated with the second aerator 21 can be easily pulled upwardly therethrough.

Figure 3:
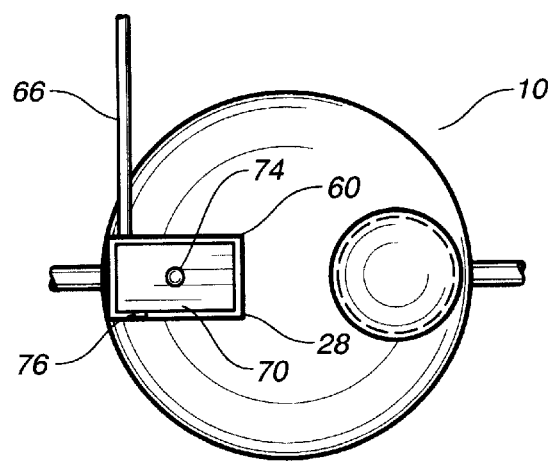
FIG. 3 is a plan view of the preferred embodiment of the present invention.

FIG. 3 shows a top view of the system 10 with the installation of the housing 60 on the platform 28. It can be seen that the warning light 74 is positioned on the top of the cover 70. The test switch 76 is located on an exterior surface of the cover 70. It can be seen that the electrical conduit 66 extends outwardly from the side of the housing 60 so as to allow the electrical line from the power supply to be connected to the control panel 34 within the interior of the housing 60.

Figure 4:
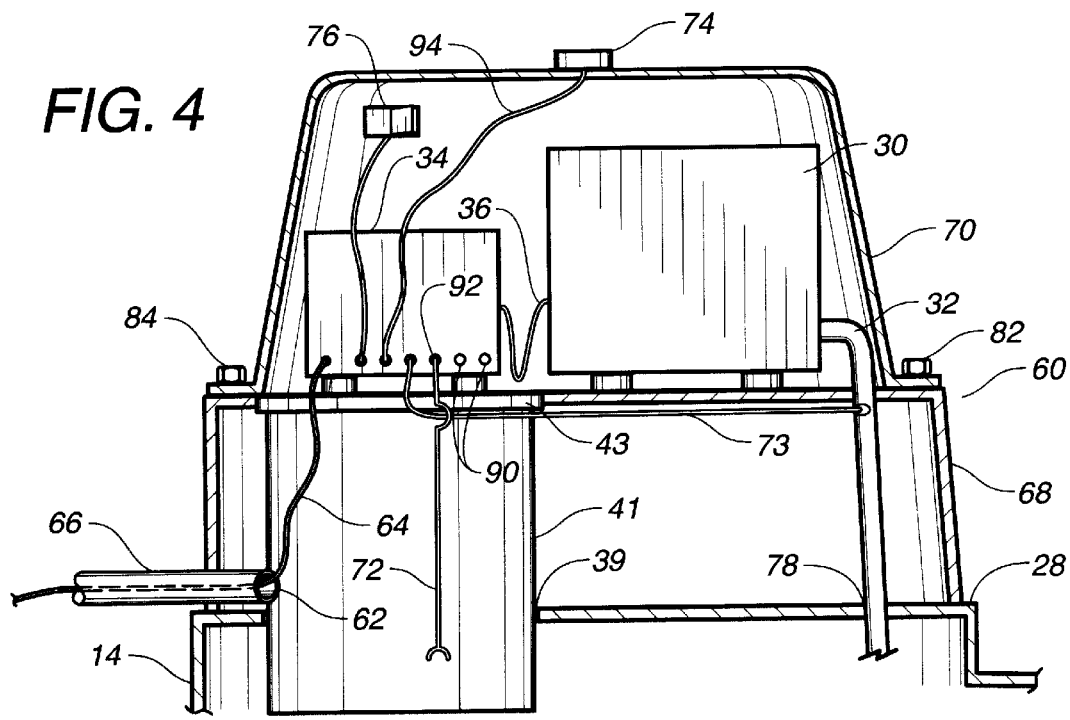
FIG. 4 is a detailed view showing the platform, housing, and associated air pump and control panel of the present invention.

FIG. 4 shows a detailed view of the components within the housing 60 of the present invention. Initially, it can be seen that the platform 28 is formed on the top 22 of the tank 14. The base 68 is connected to the platform 28. The cover 70 is connected to the top of the base 68 through the use of bolts 82 and 84. Although bolts 82 and 84 are shown for the attachment of the cover 70 to the base 68, various other means of attaching can be employed within the present invention. For example, clamps, screws, adhesives, brackets, and similar items can be used so as to effectively secure the cover 70 in a secure position to the top surface of the base 68.

In FIG. 4, it can be seen that the air pump 30 has its air line 32 extending therefrom. Air line 32 will extend through the top of the base 68 and through the hole 78 formed in the platform 28. Air line 32 will extend to the aerator within the tank 14. Power is supplied to the pump 30 through electrical line 36. Electrical line 36 is connected to a power supply outlet of the control panel 34. The control panel 34 receives its power from an electrical supply line 64. Electrical supply line 64 extends from the control panel 34 so as to extend outwardly of the housing 60 through the interior of a conduit 66. The control panel 34 has a plurality of connectors 90 formed thereon. Connectors 90 allow the various electrical connections between the components of the present invention to be suitably connected to the control panel 34. As can be seen, the electrical line 72 to the float switch 58 is connected to the control panel 34 by electrical connector 92. The pressure transducer line 73 is connected to the control panel 34. As can be seen, the pressure transducer line 73 is also connected to the air line 32 so as to monitor the pressure of air within the air line 32. Another line 94 is attached to a connector of the control panel 34 and extends to the warning light 74. Another connector 90 of the control panel 34 is connected to the test/normal/silence switch 76. As can be seen in FIG. 4, all of the components required for the control of the operation of the wastewater treatment system 10 are provided within the interior of the housing 60 in an easy access convenient manner. The only trenching that is required will be for the installation of a single electrical conduit 66 extending from the source of electrical power to the tank 14.

In FIG. 4, it can be seen that the access opening 39 is formed on the surface of the platform 28. This allows the pipe 41 to pass therethrough and to be suitably sealed within the access opening 39. The access cover 43 is placed on the end of the pipe 41 adjacent to the control panel 34. As illustrated in FIG. 4, the control panel 34 actually rests on the cover 43 of the pipe 41. When access to the aerator assembly is necessary, the cover 70 can be suitably removed so as to expose the air pump 30 and the control panel 40. The control panel 34 has electrical lines extending therethrough of a sufficient length and with sufficient slack so that the control panel 34 can simply be lifted and placed upon the top of the pump 30. The electrical line 36, which provides power to the pump 30, has a great deal of slack so as to facilitate the ability to properly move the control panel 34 from its position on the cover 43. When the control panel 34 is moved from its position on the cover 43, the cover 43 can be removed so as to gain access to the interior of the tank 14 and to the diffuser assembly 47.

The present invention provides a large number of advantages over the prior art. Initially, it is not necessary for the installers to mount the air pump housing. By providing a flat surface on the actual tank 14, it is only necessary to connect the air pump 30 to this flat surface of the tank. It is not necessary to level the earth and to grade the base so as to install the air pump 30. The installation of the tank 14 in the earth will provide the necessary support for the air pump 30. Under certain circumstances, when the air pump 30 is placed on the earth, separate from the tank 14, the air pump 30 can begin to lean because of the settling of the earth. This can present an aesthetically unpleasing appearance. Furthermore, the leaning of the air pump 30 could adversely affect the performance of the air pump 30. Since the present invention allows the air pump 30 to be supported on the earth through the relatively large bottom of the tank 14, the possibility of leaning is minimized.

The present invention eliminates the problems associated with the massive trenching required to install the various electrical and air lines from the control panel and the air pump. The present invention removes the conduit that would be required between the air pump and the control panel, the conduit required between the control panel and the treatment tank, the air line extending from the air pump and the treatment tank, and eliminates the small tubing required for the pressure testing of the air line. In the prior art, each of these components were required to be installed within a trench in the earth. The only trench that is required by the present invention is for the installation of the conduit 66. All of the other components are maintained within the interior of the tank 14 or interior of the housing 60.

Since the control panel 34 is installed within the housing 60, it is not necessary to bolt the control panel to a wall of the house. As such, the labor required to install the control panel on the house is eliminated. Furthermore, the need to actually drill holes in the house is prevented. There are very few labor requirements for the installation of the control panel 34. The aesthetically unpleasing appearance of a control panel on the side of a house is eliminated. Under all circumstances, the control panel 34 will be in an easy to reach accessible location.

By installing all of the components directly onto the tank, the possibility of crossing between the control panel and the pump is eliminated. In the prior art, whenever the air lines and/or electrical lines became crossed, any settling of the earth could cause a pinching of such lines. As such, with sufficient pinching, air delivery to the various components could be restricted and the delivery of electrical power could be hampered.

In the present invention, only one electrical conduit is required between the tank and the source of electrical power. Since the various components on the interior of the housing 60 can be factory installed, it is not necessary for the installer or the dealer to carry out all the difficult electrical connections associated with the wastewater treatment system 10. All technical wiring is done before installation of the system at the home. As a result, less skilled labor is required for the installation of the wastewater treatment system 10. Experiments with the present invention have indicated that the present invention saves approximately five hours of installation work. The present invention can be delivered complete or in component form. As such, the system can be assembled by a dealer in his shop. The wastewater treatment system 10 can be assembled under controlled circumstances rather than the complicated requirements of assembling the system 10 at the location of the customer. As a result, proper connections and proper components can always be assured. The situation in which the system is installed in an incomplete condition can be avoided.

The present invention provides simplicity of service. Since the air pump 30 and the control panel 34 are mounted together within the housing 60, it is not necessary to travel back and forth between the various components so as to carry out proper testing and new testing, inspection and maintenance. Furthermore, a single person can be in a suitable position on the top 22 of the tank 14 so as to inspect the interior of the tank 14 while manipulating the air pump 30 and/or the control panel 34. The requirement of two people for inspection and maintenance is not necessary with the present invention. Furthermore, the offset position of the access opening allows for an easy inspection of the clarifier compartment and the aeration compartment. Sampling can be carried out in a very easy and convenient manner. Additionally, the aerator 20 can be easily removed by simply pulling on the flexible conduit 42 until the diffuser assembly reaches the access opening 38 of the tank 14. The aerator 21 can be easily removed by pulling on the flexible air line 45 until the diffuser assembly passes through the small diameter access opening 39. All of the components of the present invention are located at the fingertips of the maintenance and inspection personnel.

Under certain circumstances, the purchaser of the wastewater treatment system may not desire to have all of the components retained within the housing 60. Under certain circumstances, the customer or installer may prefer that the control panel be located on the surface of the house. Alternatively, the actual customer may desire that the pump be located at a different location than the wastewater treatment tank. The present invention, through its design, allows for variation of the present invention to be achieved within the concept of the present invention.

Figure 5:
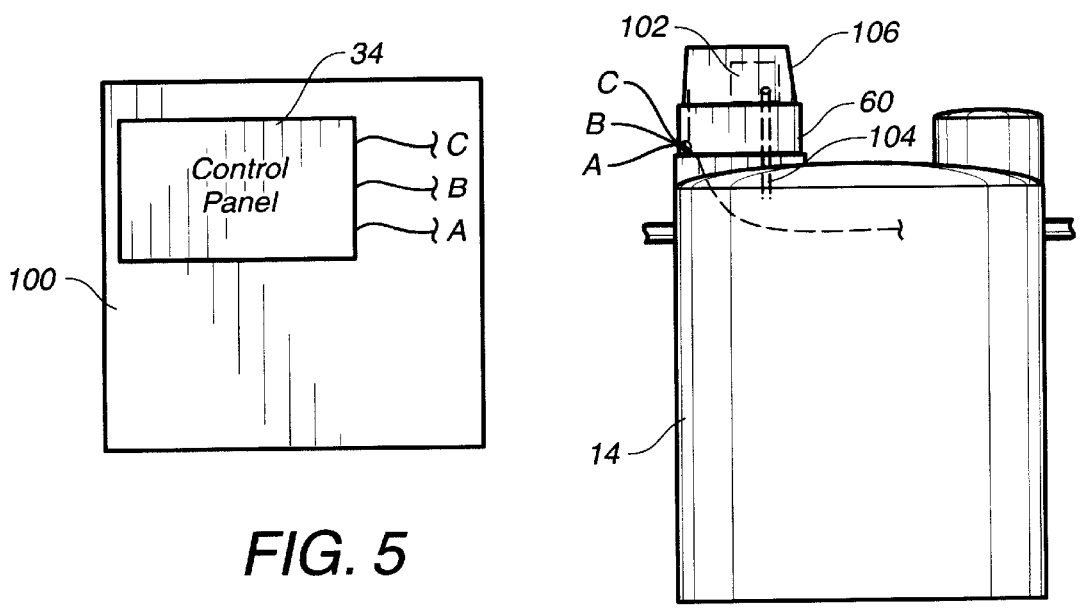
FIG. 5 is a diagrammatic illustration of an alternative embodiment of the present invention.

For example, FIG. 5 illustrates a system in which the control panel is located outside of the housing 60 of the tank 14. In FIG. 5, it can be seen that the control panel 34 is mounted on the surface of a house 100. The control panel 34 has electrical lines A and C extending to the float switch and the air pump 102 in the tank 14. The small pressure line B is connected to the air line 104 of the pump 102. Suitable conduits and trenches in the earth can be installed so that these electrical lines extend in their desired manners. As can be seen, only the air pump 102 is positioned within the cover 106 associated with housing 60.

Figure 6:
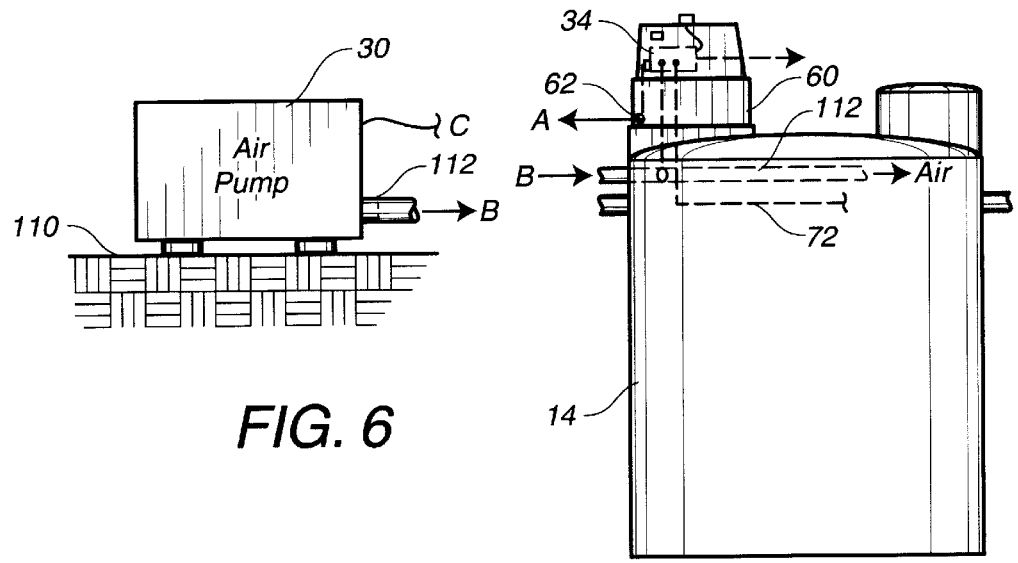
FIG. 6 is a diagrammatic illustration of another alternative embodiment of the present invention.

FIG. 6 shows the circumstance in which the air pump 30 is positioned exterior of the tank 14. As can be seen, the air pump 30 has been placed on a graded surface 110. The air pump 30 includes air line 112 extending outwardly therefrom. A power supply line C is connected to the air pump 30. Power supply line C is connected to the control panel 34 located within the interior of the housing 60 of tank 14. It can be seen that the electrical supply line A passes through a hole 62 formed in the housing 60 so as to allow for connection with the control panel 34. The pressure transducer line 73 extends from the control panel 34 to the air line 112. The float switch line 72 will extend to the float switch in the manner described herein previously.

In the embodiment shown in FIG. 6, the air pump is located at a remote location. As such, trenching and conduit installation will be required for the passing of the air line 102 from the air pump 30 to the tank 14. Additional trenching will be required so that the electrical line C from the control panel 34 to the air pump 30 is properly installed. Another trench will be required so that the conduit containing the electrical supply line A is properly installed from the source of electrical power to the tank 14.

Figure 7:
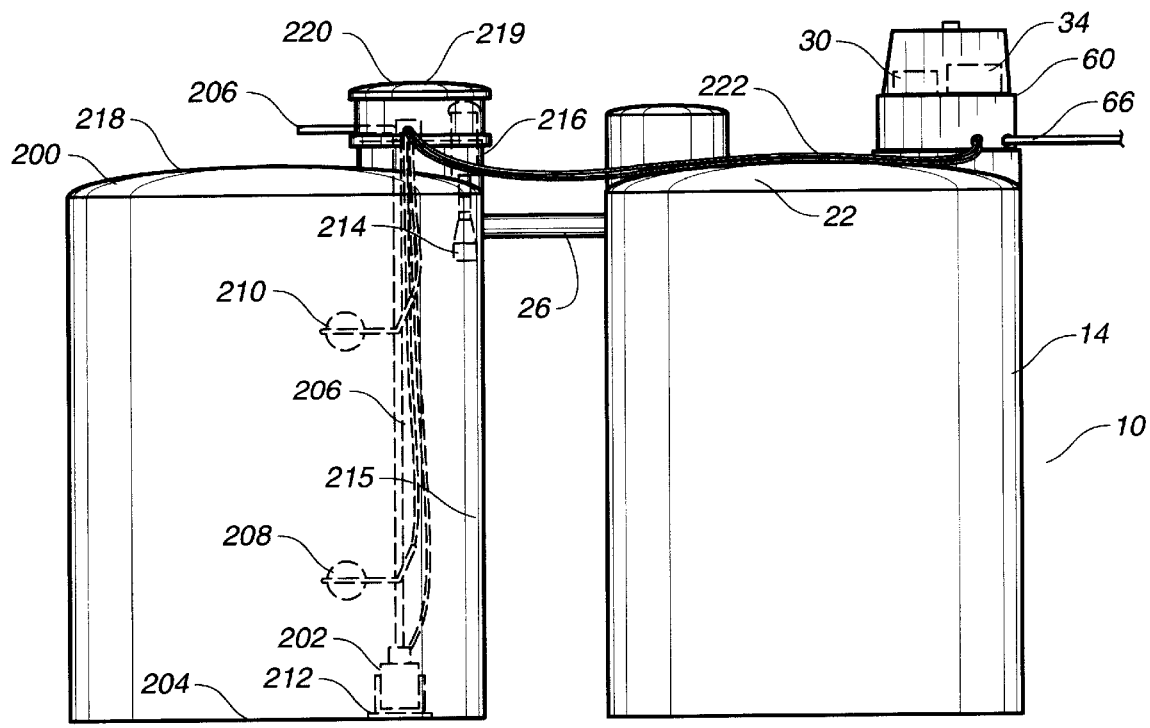
FIG. 7 is a side view showing the treatment tank in association with a pump tank as part of the wastewater treatment system of the present invention.

FIG. 7 shows the system 10 of the present invention as coupled with the use of a pump tank 200. Under certain circumstances, the wastewater treatment system 10 will be coupled to a pump tank. As such, the clarified effluent from the treatment system 10 will pass through the outlet 26 and into the interior of pump tank 200. A liquid pump 202 located adjacent to the bottom 204 of the pump tank 200 causes a flow of liquid to pass upwardly through the pump tank 200 and outwardly therefrom through pipe 206. As such, the clarified liquid can be pumped for irrigation or other distribution purposes. A first float switch 208 and a second float switch 210 are installed in the interior of the pump tank 200. The first float switch 208 will signal when the level of liquid in the pump tank 200 is too low for the operation of the pump 202. The float switch 210 will signal when the liquid level reaches a sufficient height such that the pump 202 should be actuated so that the liquid is passed through the pipe 206.

Within the concept of the present invention, so as to allow for the unitary shipment of the pump tank 200 and to facilitate the ease of installation, the pump 202 is affixed to the bottom 204 in a desired location through the use of a bracket 212. In this fixed location, it is not necessary for the installer to install the pump 202 at the location. The desired position of the pump 202 can be fixed in the factory and retained in this position during shipment and installation. Additionally, a chlorinator 214 is connected to the outlet 26 of tank 14. The chlorinator 214 serves to impart chlorine into the clarified effluent passing through the outlet 26. As such, the clarified effluent will mix with the chlorine prior to being passed into the interior of the pump tank 200. The chlorinator 214 is of a conventional design. However, in the present invention, the chlorinator 214 will be suitably strapped to the inner wall 215 of the pump tank 200. As such, the chlorinator 214 can be placed into its desired position during transport and installation. The present invention eliminates the need to install the chlorinator at the actual installation site.

In FIG. 7, it can be seen that the pump tank 200 includes an access opening 216 which is offset from the center of the top 218 of the pump tank 200. A cover 219 is placed over the access opening 216. When the cover 219 is removed, easy access is obtained to the chlorinator 214, the liquid pump 202, the pipe 206 or to the level switches 208 and 210. A junction box 220 is installed within the area of the access opening 216 so as to allow suitable electrical connections to be established to the liquid pump 202 and to the level switches 208 and 210. The present invention facilitates the ability to install these electrical connections.

In FIG. 7, it can be seen that the housing 60 includes the control panel 34 and the pump 30. The electrical supply line will extend through conduit 66 so as to be connected to the control panel 34. In the present invention, however, another hole is formed in the housing 60 so as to allow a flexible conduit 222 to be connected from the control panel 34 to the junction box 220 of the pump tank 200. Double wires will pass through the interior of the conduit 222. The leads of each of the wires within the conduit 222 can be connected to the control panel 34 within the interior of housing 60 and also connected to the junction box 220 on the pump tank 200 in a convenient and easy manner. For example, each of the wires can be suitably numbered. Each of the connectors 90 on the control panel 34 can be correspondingly numbered. Similarly, each of the connectors on the junction box 220 can be suitably numbered so that very minimal electrical knowledge is required for the installation of the wires between the control panel 34 and the junction box 220. The junction box 220 allows for the power to the liquid pump 202 and to the level switches 208 and 210 to be easily established without the need for complicated wiring.

Importantly, it can be seen that the conduit 222 rests on the top surface 22 of the tank 14. Unlike the prior art, the support provided by the top 22 of the tank 14 will prevent any damage to the wires within the conduit 222. As such, the wires within the conduit 222 will not be damaged by any settling of the earth. Each of the wires within the flexible conduit 222 is positioned in an easy location for access from the surface of the earth. This arrangement facilitates the ability to prevent damage to the wires during use and installation. Furthermore, each of the wires within the conduit 222 can be shipped as an assembled unit with only the leads to the separate wires extending outwardly of the conduit 222.

Figure 8:
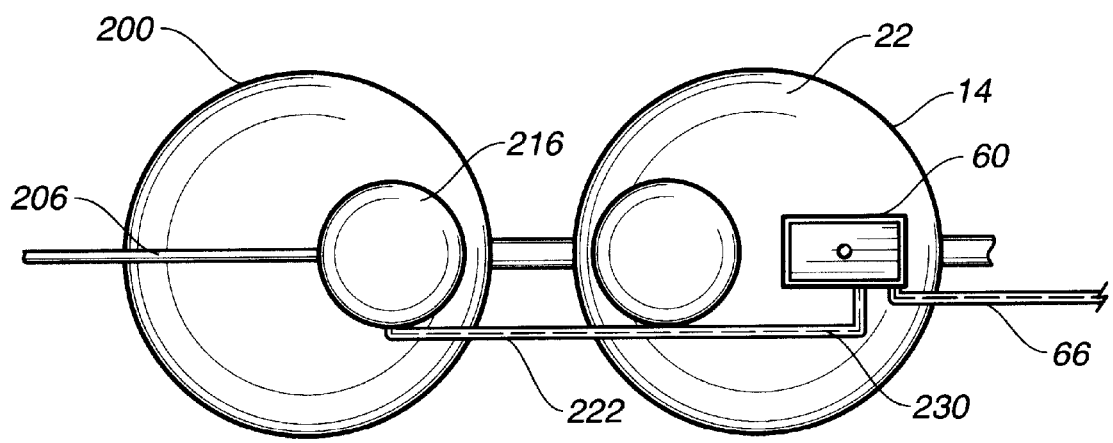
FIG. 8 is a plan view of the treatment tank/pump tank combination of the present invention.

FIG. 8 shows how the flexible conduit 220 passes from the housing 60 to the junction box within the access opening 216 of the pump tank 200. In FIG. 8, it can be seen that the wires (illustrated in broken line fashion) 230 extend through the interior of the flexible conduit 222. The flexible conduit, through much of its length, rests on the top 22 of the tank 14. The electrical supply line passes to the control panel 34 through conduit 66. As can be seen, the conduit 222 allows for an electrical connection to the junction box 220 of the pump tank 200 to be installed without the need for additional trenching. The support for the conduit 222 on the top 22 of tank 14 prevents damage or pinching of the wires 230 within the conduit 222. Since each of the tanks 14 and 200 are placed in close proximity, the amount of wire and conduit required for such a connection is minimized. Furthermore, the close proximity of each of the tanks 14 and 200 allows both tanks to be installed within a single excavation. The single trench required for the electrical supply line 66 is the only trenching that is required for the installation of the system of the present invention.

Figure 9:
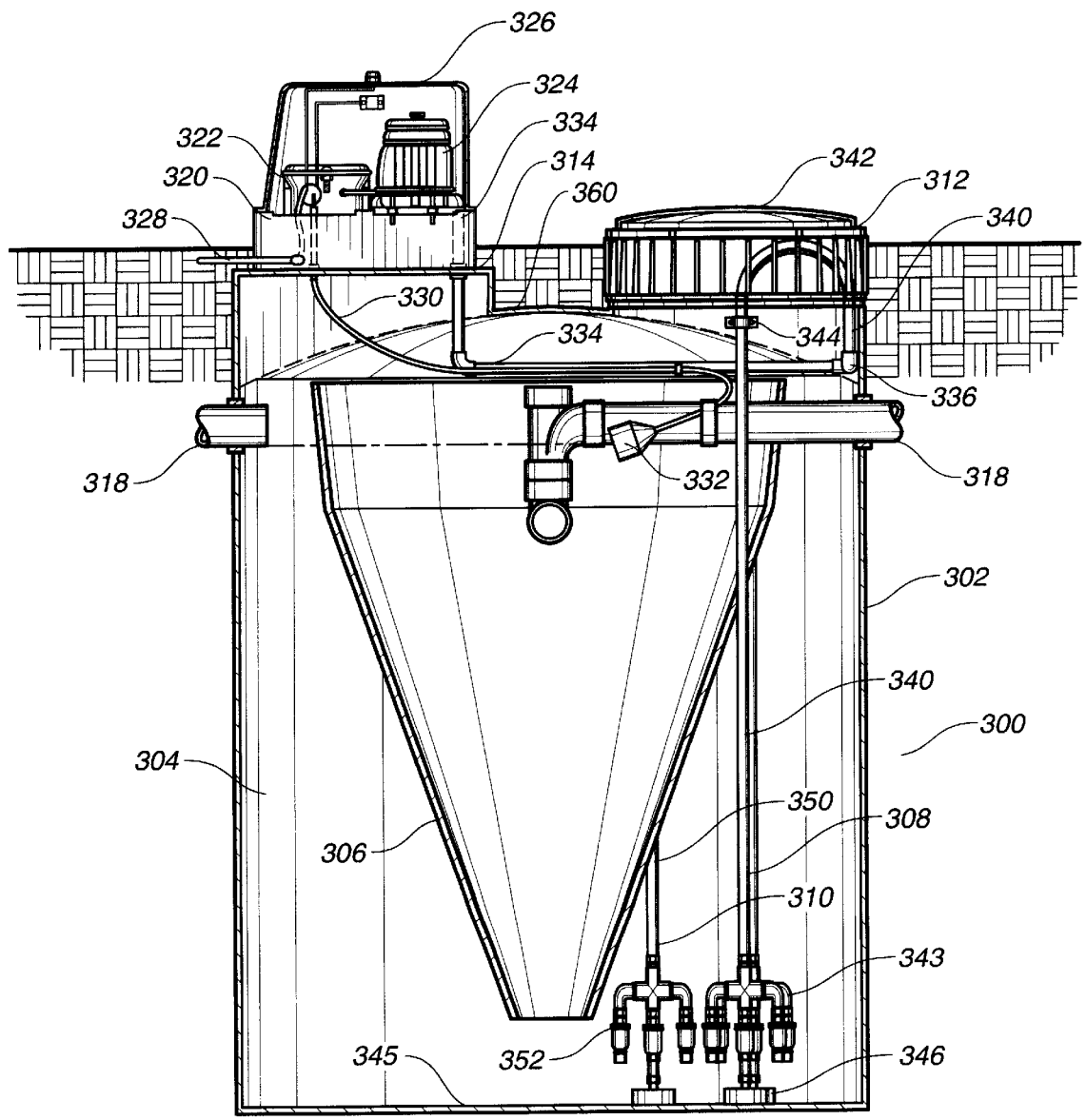
FIG. 9 is a cross-sectional side view of an alternative embodiment of the present invention.

Referring to FIG. 9, there is shown at 300 an alternative embodiment of the wastewater treatment system of the present invention. As can be seen in FIG. 9, the wastewater treatment system 300 includes a tank 302 having an aeration compartment 304, a clarifier compartment 306 and aerator assemblies 308 and 310. In the alternative embodiment 300, the aerator assemblies 308 and 310 are positioned so as to be accessible below the access opening 312 of tank 302. In the alternative embodiment 300, the second access opening located below the platform 314 (along with the second aerator assembly located therebelow) have been omitted.

The tank 302 has an inlet 316 and an outlet 318 of a similar configuration as described herein previously. The platform 314 has base 320 affixed thereto. The control panel 322 and the pump 324 are positioned on the top of the base 320. Unlike the previous embodiment, the control panel 322 will rest upon a top surface of the base 320. A cover 326 will extend over the pump 324 and the control panel 322. A single electrical power supply line 328 will extend into the base 320 so as to be connected with the control panel 322. The control panel 322 has an electrical line 330 extending to float switch 332. The control panel 322 has an electrical supply line connected to the pump 324. The pump 324 has an air line 334 extending downwardly through the base 320 and through the platform 314. Air line 334 will extend across the top of the clarifier compartment 306 so as to be connected to a T-fitting 336 adjacent to the inner wall 338 of tank 302. A flexible air line portion 340 will extend upwardly from the T-fitting 336 so as to reside adjacent to the access opening 312. A cover 342 will extend over the access opening 312. A clip 344 serves to secure the flexible air line 340 in its desired position. The flexible air line 340 will extend downwardly so as to be connected with a special diffuser assembly 343 located adjacent to the bottom 345 of the tank 302. The diffuser assembly 343 is secured against the bottom 345 of the tank 302 through the use of anchor weights 346 attached thereto. The diffuser assembly 343 has multiple diffusers extending in parallel relationship. The multiple diffusers used on the diffuser assembly 343 allow for easy repair and replacement should one of the diffusers be defective or become nonfunctional. Furthermore, adequate aeration capacity is achieved even though one of the diffusers may be defective or inoperable.

Another air line 350 will extend from the T-fitting 336 downwardly to a second diffuser assembly 352. The second diffuser assembly 352 has an identical configuration as the diffuser assembly 343. The second diffuser assembly 352 is located a desired distance away from the first diffuser assembly 343 so that individual flow paths of air bubbles pass to the surface of the effluent residing in the aeration compartment 304. The diffuser assemblies 343 and 352 should be sufficiently spaced so as to prevent any commingling of the air bubbles passing therethrough. Experiments have shown that when the diffuser assemblies 343 and 352 are separated by at least 36° (the vertex being the center line of the tank 302), a "vortex" effect is created which serves to pull the individual flow paths of air bubbles back downwardly into the effluent. As such, the arrangement creates both small bubbles and keeps these bubbles in solution for a longer period of time.

Access to each of the diffuser assemblies 343 and 352 is gained through the access opening 312. Although the access opening 312 will have a larger diameter than that shown in the previous embodiment of the present invention, it does allow for access to be achieved for both of the diffuser assemblies 343 and 352 in a convenient manner.

It should be noted that the access opening 312, along with the platform 314, can be located at any position along the top 360 of the tank 302. It is not required that the access opening 312 be directly opposite the platform 314. Furthermore, if necessary, multiple access openings 312 can also be formed on the top 360. Furthermore, if necessary, multiple platforms 314 could also be formed on the top 360.

Figure 10:
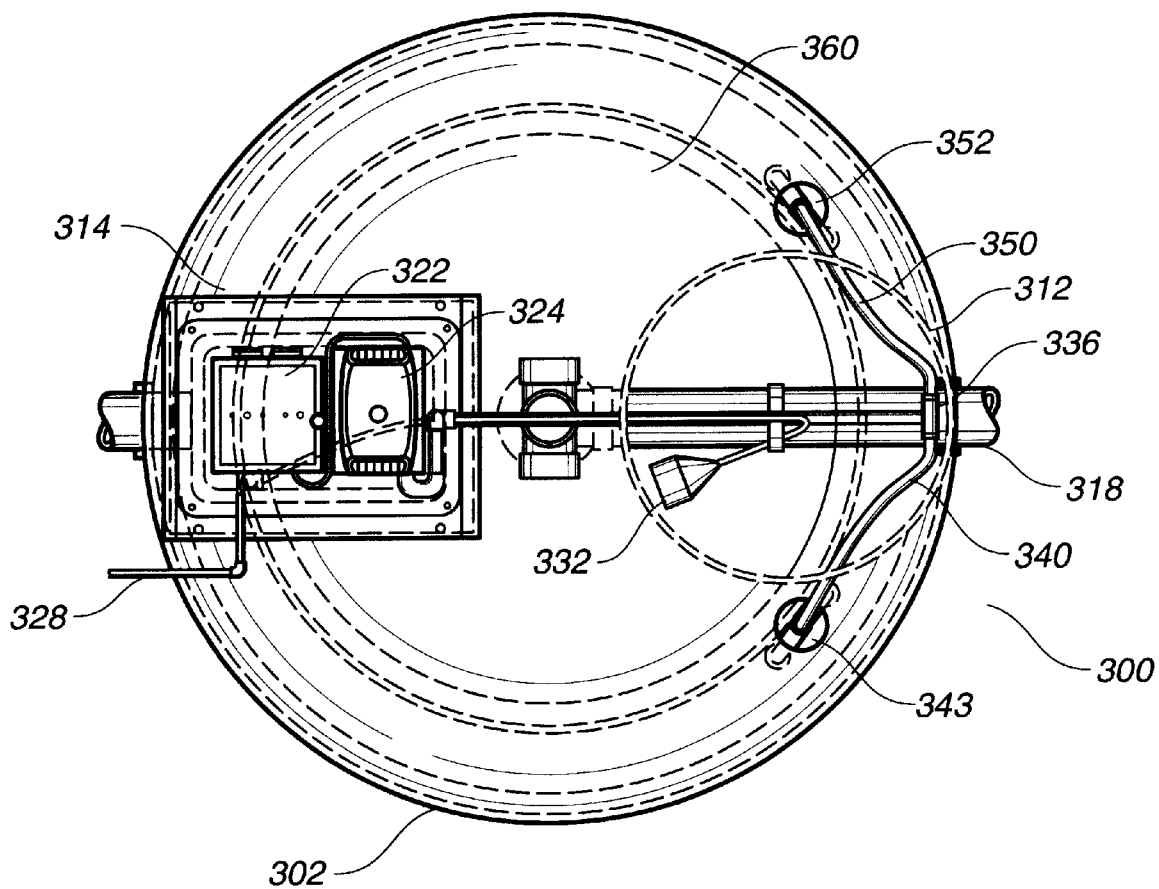
FIG. 10 is a plan, partially transparent, view of the alternative embodiment of FIG. 9.

FIG. 10 is a plan view of the alternative embodiment 300 of the present invention. As can be seen in FIG. 10, the wastewater treatment system 300 has its access opening 312 located on the opposite side of the top 360 from the platform 314. The access opening 302 has a sufficiently large diameter (at least twenty inches) so as to allow for easy access to the flexible air lines 340 and 350 extending to diffuser assemblies 343 and 352, respectively. It can be seen that each of the flexible air lines 340 and 350 is connected to T-fitting 336. The diffuser assemblies 343 and 352 are suitably spaced more than 36° from each other within the tank 302.

In FIG. 10, it can be seen that the platform 314 has a generally rectangular configuration. The control panel 322 and the pump 324 are illustrated as supported within the confines of the platform 314. Electrical power line conduit 328 is illustrated as extending outwardly of the platform 314 for connection to an exterior source of power.

The float switch 332 is supported by the outlet 318 in the area below the access opening 312. As such, if the float switch 332 should become damaged or require inspection or maintenance, easy access to the float switch is achieved by the offset positioning of the access opening 12.

Figure 11:
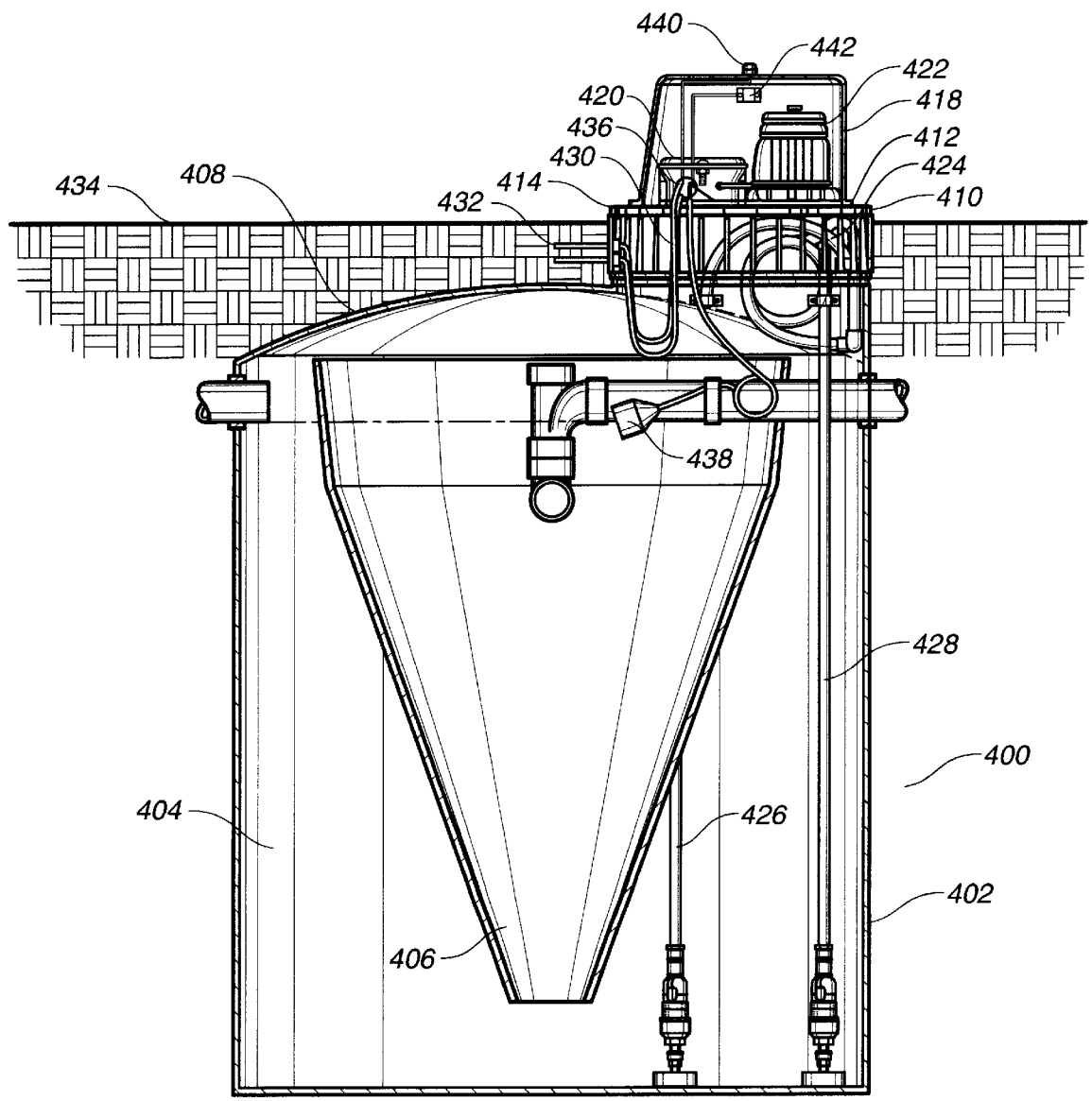
FIG. 11 is a cross-sectional side view of another alternative embodiment of the present invention.

Referring to FIG. 11, there is shown an alternative embodiment 400 of the wastewater treatment system of the present invention. The wastewater treatment system 400 includes a tank 402 having an aeration compartment 404 and a clarifier compartment 406. The tank 402 has a top 408 extending thereover. Top 408 has an access opening 410 with a cover 412 extending thereover.

Unlike the previous embodiments, the wastewater treatment system 400 has housing 414 positioned directly onto the cover 412 over the access opening 410. The housing 414 includes base 416 and cover 418. The control panel 420 is positioned on the base 416 and within the cover 418. The pump 422 is also positioned on the base 416 and within the cover 418. The pump 422 has an air line 424 extending downwardly so as to connect to the aerators 426 and 428. The aerators 426 and 428 are positioned generally adjacent to and below the access opening 410.

The control panel 420 has electrical line 430 extending therefrom. A conduit 432 extends through the earth 434 so as to allow an external source of power to be connected to the electrical line 430. The conduit 432 will extend below the surface of the earth 434. A line 436 will extend from the control panel 420 so as to connect to the float switch 438. The control panel 420 is also connected to the warning light 440 and to the test switch 442.

The wastewater treatment system 400 is a variation on the previous embodiments. By placing the "platform" directly onto the top of the cover 412 of the access opening 410, the pump 422 and the control panel 420 can be placed directly above the aerators 426 and 428. As such, this positioning will tend to minimize the length of air lines 424 which extend into the tank 402. Furthermore, this positioning will create only one "monument" extending above the surface of the earth 434. The air line 424, along with electrical lines 430 and 436 should have sufficient slack so as to allow the cover 412, along with the housing 414, to be removed from the access opening 410. It can be seen that the top 408 of tank 402 remains buried below the earth 434.

The foregoing disclosure and description of the invention is illustrative and explanatory thereof Various changes in the details of the illustrated construction may be made within the scope of the appended claims without departing from the true spirit of the invention. The present invention should only be limited by the following claims and their legal equivalents.

I claim:

1. A wastewater treatment system comprising the following:
   a. a cylindrical tank having an open end and a cylindrical wall and including a clarifier compartment surrounded by an aeration compartment within said cylindrical wall, said aeration compartment having a first aerator therein;
   b. a top extending over said aeration and clarifier compartments and capping said open end;
   c. a raised platform formed on said top and having a generally horizontal top end, said platform having an outer periphery which intersects at least at one point of said cylindrical wall, said first aerator located directly below said platform;
   d. an access opening having a smaller diameter than said cylindrical wall and formed in said top, said access opening located along the periphery of said cylindrical wall diametrically opposite said platform; said access opening also located such that a wall dividing said clarifier and aeration compartments is located directly below said access opening, thereby allowing access to both compartments; and
   e. an air pump mounted to said horizontal top end of said platform, said air pump having an air line extending into said aeration compartment to said first aerator.

2. The system of claim 1, further comprising:
   a control panel affixed to said top of said tank, said control panel being electrically connected to said air pump.

3. The system of claim 2, said control panel having an electrical supply line connected thereto, said electrical supply line extending outwardly of said tank.

4. The system of claim 3, further comprising:
   a housing attached to said platform, said housing extending over said air pump and said control panel, said housing having an opening therein, said electrical supply line extending through said opening.

5. The system of claim 4, further comprising:
   a float switch means electrically connected to said control panel, said float switch means for adapted to monitor a level of liquid within said tank.

6. The system of claim 4, further comprising:

a pressure transducer means connected to said air pump and to said control panel, said pressure transducer adapted to monitor a pressure of air passing through said air line to said first aerator.

7. The system of claim 4, further comprising:

a warning signal affixed to an exterior of said housing, said warning signal electrically connected to said control panel within said housing, said warning signal adapted to indicate an alarm condition affecting an interior of said tank.

8. The system of claim 2, further comprising:

a pump tank connected to an outlet of said tank, said pump tank having a liquid pump therein for passing a liquid outwardly from an interior of said pump tank, said control panel being electrically interconnected to said liquid pump of said pump tank.

9. The system of claim 8, further comprising:

an electrical line extending from said control panel to said liquid pump, said electrical line extending over said top of said tank.

10. The system of claim 1, further comprising:

a housing attached to said platform, said housing extending over said air pump, said air pump having an electrical line supplying electricity thereto, said electrical line extending through an opening in said housing and extending exterior of said tank.

11. The system of claim 10, said housing comprising:

a base affixed to said platform, said air line passing through a hole in said platform and into said interior of said tank, said air pump positioned on a surface of said base above said platform; and a cover removably affixed to said base, said cover extending over and around said air pump.

12. The system of claim 1, said aeration compartment having a second aerator positioned therein directly below said access opening; and said platform having an access opening, said first aerator positioned directly below said platform access opening.

13. The system of claim 12, said second aerator positioned approximately 180° from said first aerator.

14. The system of claim 12, said first and second aerators being removably affixed to a bottom of said tank, said bottom of said tank being continuously flat in an area between said first and second aerators and below said clarifier compartment.

15. The system of claim 1, said aeration compartment having a second aerator positioned therein, said second aerator positioned adjacent to and below said access opening, said second aerator being separated by at least 36° from said first aerator.

* * * * *